UNITED STATES PATENT OFFICE.

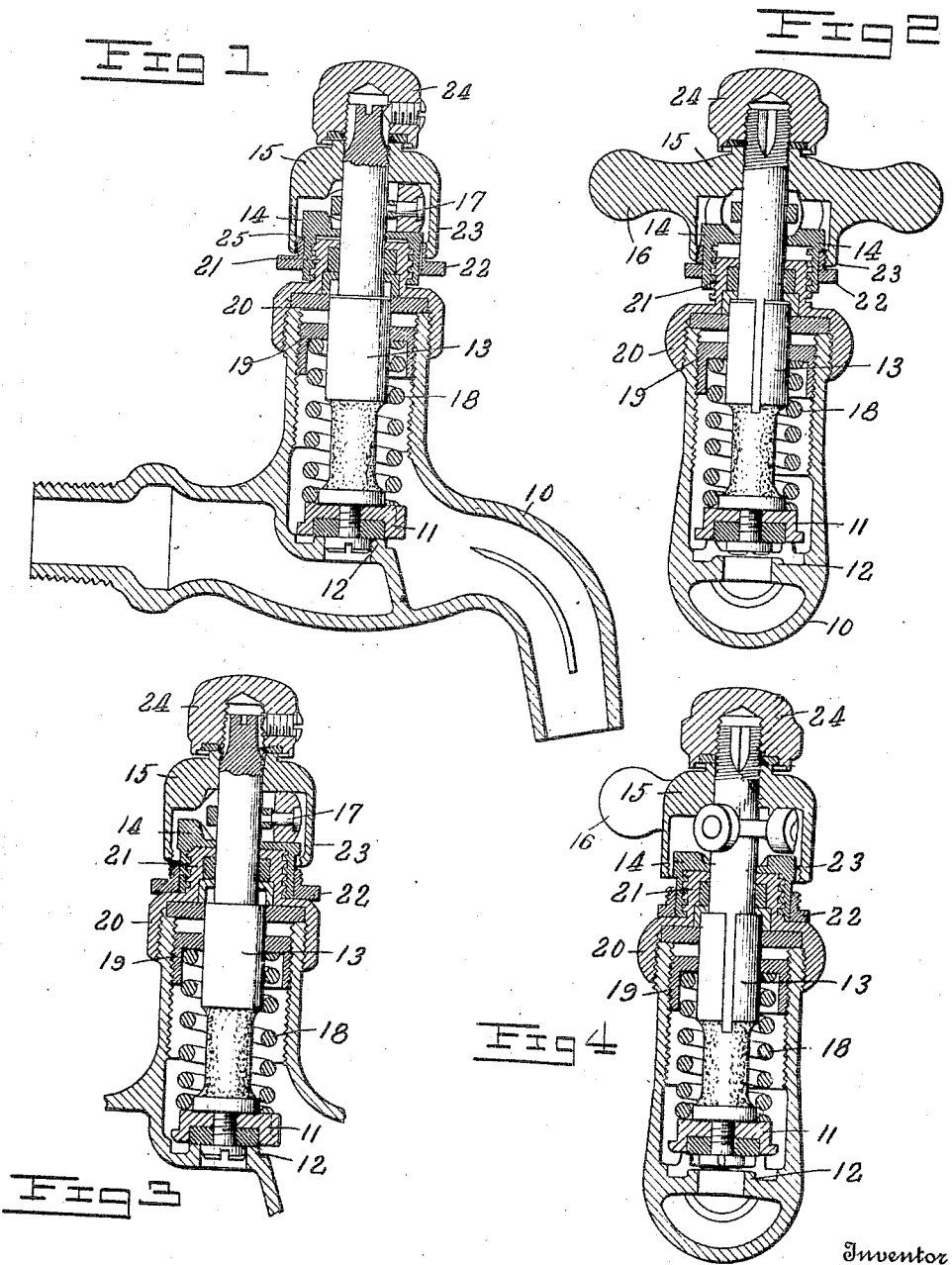

ANTON C. SCHUERMANN, OF DECATUR, ILLINOIS, ASSIGNOR TO H. MUELLER MANUFACTURING COMPANY, OF DECATUR, ILLINOIS, A CORPORATION OF ILLINOIS.

CONVERTIBLE SELF-CLOSING AND COMPRESSION COCK.

1,044,694.      Specification of Letters Patent.      Patented Nov. 19, 1912.

Application filed March 28, 1911. Serial No. 617,406.

*To all whom it may concern:*

Be it known that I, ANTON C. SCHUERMANN, a citizen of the United States, residing at Decatur, in the county of Macon and State of Illinois, have invented new and useful Improvements in Convertible Self-Closing and Compression Cocks, of which the following is a specification.

My invention consists of a cock which may be operated either as a non-automatically closing cock after the manner of a compression cock or plug cock, or as an automatically or self-closing cock, and is convertible from one to the other at will.

There are many instances in which a purchaser or a dealer desires to change the operation of the cock. Among these instances may be mentioned particularly instances in hotels where customers desire to use running water at the lavatories. And in any case where it is at times desired to maintain a regulated flow of water this change is desirable.

By means of my invention, a self-closing cock may be opened or closed to any desired degree and will remain opened or closed at any position.

In the accomplishment of my invention I provide a cock with a movable part adapted normally to operate the cock as an automatically or self-closing cock. I provide further a means comprising a movable part adapted to coöperate with the first named movable part to operate the valve as a non-automatically closing valve and by which the valve is manually operated to all positions and set in these positions after the manner of a compression cock. Together with these provisions, means by which said movable parts can be connected and disconnected at will secures to me the attainment of my invention.

It will be apparent upon an understanding of my invention that my convertible automatically or self-closing and non-automatically closing cock comprises an automatically or self-closing operating means, and a non-automatically closing or compression operating means, said latter means comprising a member for interlocking two parts thereof together. Structural details of invention also find place in the embodiment I disclose.

Of the accompanying drawings:—Figure 1 is a central, longitudinal section of the cock of my invention showing the valve in closed position and the non-automatically closing operating means in use. Fig. 2 is a transverse section of Fig. 1, showing the same mechanism in operation and the valve open. Fig. 3 is a partial section similar to Fig. 1 showing the automatically or self-closing operating means in use with the valve closed, and Fig. 4 is a section similar to Fig. 2, showing the same operating means in use and the valve open.

Referring to the drawings, 10 is the valve casing, 11 the valve, and 12 the valve seat of the cock. Associated with the valve 11 is the usual stem 13, and grouped around this stem are the various elements of an automatically or self-closing operating means. As shown this means comprises a fixed trackway 14, a movable trackway 15 connected to the stem, and provided with an operating handle 16, and intervening rollers 17 for causing the opening of the valve upon the turning of the handle. Upon the release of the handle the valve is closed by a spring 18 which is placed under tension by the opening of the valve, the spring being confined between the valve 11 and an abutment 19 on the casing. Other details there are to this self-closing operating means, but they need not be mentioned in connection with this invention. Also grouped about the stem are the elements of the non-automatically closing operating means. This means comprises the gland nut 20 or other fixed part which is provided with a screw-thread 21 at its upper end. The lower trackway 14, instead of being formed on a permanently fixed part, as for instance on the body of the gland 20 itself, as is usual, is formed separately and with a cup portion receiving the upper end of the gland nut 20 and being interiorly screw threaded to engage the threads 21 of the gland nut. It should be evident that if the member 14 is turned so as to withdraw it away from the gland nut, the upper trackway 15 will be raised by movement of the rollers 17 between the lower and upper trackways. The handle 16 carries a bonnet 23 inclosing the trackways 14 and 15 and the rollers 17 to prevent accumulation of dirt and the like thereon. By interlocking means which I have provided, however, the self-closing cock may be made to operate as a non-automatically closing cock by the turning of the same handle 16 by which it is operated as a self-closing cock. This interlocking or connecting means comprises an externally threaded collar 22 surrounding the lower trackway 14 and having screw-threaded engagement in the lower end of the depending bonnet or apron 23 of the handle 16 which is confined by the abutment 24 on the valve stem. This member 22 is adapted to bear against a shoulder 25 on the lower trackway 14, and when screwed up firmly within the bonnet 23 acts to clamp the lower and upper trackways together and upon the intervening rollers 17, whereupon both trackways will turn together. This situation is shown in Figs. 1 and 2, in which the valve is shown operated as a non-automatically closing cock. In Fig. 1 the valve is shown closed, and this closure is maintained by the spring 18. When the operating handle is turned in the opposite direction, the screw threads of the moving part 14 act to raise the valve from its seat against the pressure of spring 18, as shown in Fig. 2.

In Figs. 3 and 4 the valve is shown operating as a self-closing cock, the self-closing operating means acting automatically to close the cock in the well known manner. As is clearly seen in Figs. 3 and 4 the interlocking or connecting member 22 is removed from engagement with the bonnet 23, and from engagement with the abutment 25 on the lower trackway. The operation as a self-closing cock is therefore free from interference by the connecting member 22.

While I have described the best forms of my invention now known to me, and have described it in connection with a cock designed normally to operate as a self-closing cock, it should be evident that many changes may be made in the construction by those skilled in the art, and that it may as well be applied and that without departing in any wise from the generic spirit of my invention, to a cock which normally operates as a non-automatically closing cock.

I desire to cover in the annexed claims all such modifications as fall within the legal purview of my invention.

What I claim is:—

1. A convertible automatically closing and non-automatically closing cock including a valve, non-automatically operable means for opening and closing the valve, said means comprising a fixed part and a movable operating part connected to the fixed part, said operating part comprising a handle and a connecting member for connecting the handle to the operating part, and a normally inoperative spring associated with the valve to automatically close the same when open when the handle is disconnected from said operating part.

2. A convertible self-closing and non-automatically closing cock, comprising a valve and a valve seat, means for manually moving the valve from its seat and returning the valve to its seat, means normally inoperative for automatically returning the valve to its seat, said first named means comprising means for rendering said automatically returning means operative whereby the said cock is converted from a non-automatically closing cock to an automatically or self-closing cock.

3. A self-closing cock comprising a valve and a valve seat, means for moving the valve from its seat comprising an axially movable valve stem and means for moving the same, the last named means comprising a movable part and a normally stationary part, automatic means for returning the valve to its seat, a fixed part having screw-threads, said normally stationary part threaded thereon, and means for clamping said normally stationary part to the said movable part, whereby the automatically or self-closing cock is converted into a non-automatically closing cock.

4. A self-closing cock comprising a valve, a valve seat, means for moving the valve from its seat comprising a valve stem and upper and lower tracks fixed to the stem and the casing respectively, and intervening rollers on the tracks, means for moving one track with respect to the other to open the valve, a spring for closing the valve, a screw-threaded connection between one of said tracks and a fixed part of the valve casing, and means for connecting said tracks to turn together.

5. A self-closing cock comprising a valve, a valve seat, means for moving the valve from its seat comprising a valve stem and upper and lower tracks fixed to the stem and the casing respectively, and intervening rollers on the tracks, means for moving one track with respect to the other to open the valve, a spring for closing the valve, a screw-thread connection between one of said tracks and a fixed part of the valve casing, means for interlocking the tracks comprising a collar surrounding one track member adapted for screw-threaded engagement with the other track member, and an abutment on the track member surrounded by the collar adapted to be engaged by said collar.

6. A convertible automatically or self closing and non-automatically closing cock comprising a valve, a valve seat, non-automatically operable means for moving the valve to and from its seat, said means comprising a fixed part and a movable operating part in screw threaded connection with the fixed part, said movable part comprising a handle for the valve and a connecting member adapted to connect the handle to said movable part, and a normally inoperative spring associated with the valve to automatically close the same when open, when the handle and said movable part are disconnected.

7. A self-closing cock comprising a valve, a stem therefor, a normally fixed but movable track-way, a movable track-way connected to the stem, rollers located between the track-ways to lift the movable track-way and raise the stem and valve to open the valve, a spring for closing the valve after it is open, a permanently fixed part having a screw-threaded engagement with said normally fixed but movable track, and means for connecting said tracks whereby they may be moved together.

8. In an automatically or self-closing cock, a fixed member, a movable member normally stationary threaded to the fixed member, a valve, a hood for the cock having connection with the valve and being freely movable toward and from said movable member to open and close the valve, and a connecting member carried on said movable member adapted to engage the hood to bind the same to the said movable member whereby the valve is operable by the threaded movable member.

9. A self-closing cock comprising a casing having a valve seat, a valve adapted to engage the seat, a pair of coöperating members associated with the valve to open the same, a normally operative spring engaging the valve to automatically close the same, one of said members being normally stationary and having threaded engagement with the casing, and means for locking the members together for movement in unison relative to the casing whereby said spring is held inoperative and the automatically closing cock is converted into a non-automatically closing cock.

10. A convertible self-closing and non-automatically closing cock comprising a casing, a threaded member normally stationary threaded on the casing for movement with respect thereto, a hood engaging over the member and adapted for free movement toward and from the same, a stem carried by the hood and extending into the casing, a valve on the stem adapted to be opened and closed thereby, a normally operative spring associated with the stem for automatically closing the valve, and means on the threaded member adapted to engage the hood and connect the same to the threaded member whereby the spring is held inoperative and the hood is moved in unison with the threaded member relative to the casing.

In testimony whereof I have hereunto set my hand in presence of two subscribing witnesses.

ANTON C. SCHUERMANN.

Witnesses:
   LEONARD F. McKIBBEN,
   WILLIAM R. BIDDLE.